United States Patent
Yu et al.

(10) Patent No.: US 7,853,296 B2
(45) Date of Patent: *Dec. 14, 2010

(54) MOBILE VIRTUAL AND AUGMENTED REALITY SYSTEM

(75) Inventors: Han Yu, Carpentersville, IL (US); Eric R. Buhrke, Clarendon Hills, IL (US); Julius S. Gyorfi, Vernon Hills, IL (US); Juan M. Lopez, Chicago, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 646 days.

This patent is subject to a terminal disclaimer.

(21) Appl. No.: 11/930,974

(22) Filed: Oct. 31, 2007

(65) Prior Publication Data

US 2009/0111434 A1 Apr. 30, 2009

(51) Int. Cl.
*H04M 1/00* (2006.01)
(52) U.S. Cl. ............... 455/566; 455/456.1; 345/1.1
(58) Field of Classification Search ........... 455/566, 455/456.1–457; 345/1.1, 2.3, 4, 156
See application file for complete search history.

(56) References Cited

U.S. PATENT DOCUMENTS

| | | |
|---|---|---|
| 6,317,127 B1 | 11/2001 | Daily et al. |
| 6,377,793 B1 | 4/2002 | Jenkins |
| 6,681,107 B2 | 1/2004 | Jenkins et al. |
| 6,879,835 B2 | 4/2005 | Greene et al. |
| 6,917,370 B2 | 7/2005 | Benton |
| 7,042,421 B2 | 5/2006 | Hobgood et al. |
| 7,050,078 B2 | 5/2006 | Dempski |
| 7,113,618 B2 | 9/2006 | Junkins et al. |
| 2002/0177435 A1 | 11/2002 | Jenkins et al. |
| 2004/0203903 A1 | 10/2004 | Wilson et al. |
| 2005/0099400 A1 | 5/2005 | Lee et al. |
| 2005/0131776 A1 | 6/2005 | Perotti et al. |
| 2005/0289590 A1 | 12/2005 | Cheok et al. |

(Continued)

FOREIGN PATENT DOCUMENTS

JP  2003-303356 A  10/2003

(Continued)

OTHER PUBLICATIONS

Lim, et al., "My Virtual Graffiti System," IEEE International Conference on Multimedia and Expo, pp. 847-850, 2004.

(Continued)

*Primary Examiner*—Kamran Afshar (57) ABSTRACT

A method and apparatus for messaging within a mobile virtual and augmented reality system is provided herein. During operation a user can create "virtual graffiti" (203) that will be left for a particular device (105, 107, 109) to view as part of an augmented reality scene. The virtual graffiti will be assigned to a particular physical location. The virtual graffiti is then uploaded to a network server, along with the location and individuals who are able to view the graffiti as part of an augmented reality scene. When a device that is allowed to view the graffiti is near the location, the graffiti will be downloaded to the device and displayed as part of an augmented reality scene. Content filtering may take place on the graffiti so that only specific graffiti is displayed on a user's device.

16 Claims, 7 Drawing Sheets

U.S. PATENT DOCUMENTS

| | | | |
|---|---|---|---|
| 2006/0085419 A1 | 4/2006 | Rosen | |
| 2006/0241859 A1 | 10/2006 | Kimchi et al. | |
| 2006/0277474 A1 | 12/2006 | Robarts et al. | |
| 2007/0024527 A1 | 2/2007 | Heikkinen et al. | |
| 2007/0032244 A1 | 2/2007 | Counts et al. | |
| 2007/0038944 A1 | 2/2007 | Carignano et al. | |
| 2007/0043828 A1 | 2/2007 | Famolari et al. | |
| 2008/0122871 A1* | 5/2008 | Guday | 345/634 |
| 2008/0225779 A1* | 9/2008 | Bragiel et al. | 370/328 |
| 2009/0054084 A1* | 2/2009 | Buhrke et al. | 455/456.3 |
| 2009/0081959 A1* | 3/2009 | Gyorfi et al. | 455/70 |
| 2010/0194782 A1* | 8/2010 | Gyorfi et al. | 345/633 |

FOREIGN PATENT DOCUMENTS

| | | |
|---|---|---|
| JP | 2006-313549 A | 11/2006 |
| KR | 10-2002-0043589 A | 6/2002 |
| KR | 10-2005-0055506 A | 6/2005 |
| KR | 10-2005-0078136 A | 8/2005 |
| KR | 10-2006-0057150 A | 5/2006 |
| KR | 10-2008-0022983 A | 3/2008 |
| WO | 2001-24067 A1 | 4/2001 |

OTHER PUBLICATIONS

Hughes, "Experimental Wireless Art Project Enables Virtual Graffiti," University of Georgia Research, http://tagging.us/html/pr.html, downloaded Mar. 14, 2008.

Singh, et al., "Augmented Reality Post-It System," ACM SIGCHI International Conference on Advances in Computer Entertainment Technology, 2004.

Garner, et al., "The Mobile Phone as Digital SprayCan," ACM SIGCHI International Conference on Advances in Computer Entertainment Technology, 2006.

Simon, et al., "Towards Orientation-Aware Location Based Mobile Services," Third Symposium on LBS and Telecartgraphy, Vienna, Austria, Nov. 28-30, 2005.

Jonietz, "TR10: Augmented Reality; Markus Kahari Wants to Superimpose Digital Information on the Real World," MIT Technology Review, Mar. 12, 2007.

Nokia, "Nokia Research Project: MARA," http://research.nokia.com/research/projects/mara/index.html, downloaded Mar. 14, 2008.

Rekimoto, et al., "Augment-able Reality: Situated Communication through Digital and Physical Spaces," IEEE 2nd International Symposium on Wearable Computers, pp. 68-75, 1998.

Rekimoto, "Transvision: A Hand-Held Augmented Reality System for Collaborative Design," International Conference on Virtual Systems and Multimedia, pp. 85-90, 1996.

Mayfield, "Augmented Moblogging," Ross Mayfields Weblog: Markets, Technology and Musings, http:/radio.weblogs.com, Jan. 28, 2003, pp. 1-6.

Kharif, "Social Networking Goes Mobile," Business Week Online, www.businessweek.com, May 31, 2006, pp. 1-2.

Kwang Sik Kim, "PCT International Search Report and Written Opinion," WIPO, ISA/KR, Korean Intellectual Property Office, Daejeon, Republic of Korea, Apr. 16, 2009.

* cited by examiner

MOBILE VIRTUAL AND AUGMENTED REALITY SYSTEM

FIELD OF THE INVENTION

The present invention relates generally to messaging, and in particular, to messaging within a mobile virtual and augmented reality system.

RELATED APPLICATIONS

This application is related to application Ser. No. 11/844,538, entitled MOBILE VIRTUAL AND AUGMENTED REALITY SYSTEM, filed Aug. 24, 2007, application Ser. No. 11/858,997 entitled MOBILE VIRTUAL AND AUGMENTED REALITY SYSTEM, filed Sep. 21, 2007.

BACKGROUND OF THE INVENTION

Messaging systems have been used for years to let users send and receive messages to each other. Currently, one of the simplest ways to send a message to another individual is to simply send a text message to the individual's cellular phone. Recently, it has been proposed to expand the capabilities of messaging systems so that subscribers of the network may be given the option of leaving a specific message at a particular coordinate location. For example, in U.S. Pat. No. 6,681,107B2, SYSTEM AND METHOD OF ACCESSING AND RECORDING MESSAGES AT COORDINATE WAY POINTS, the author proposes that a subscriber can merely push a button at a specific location causing the Device to save the physical location. Then he can push a "record message" button which allows him to speak a message into his device. This message could be directions to the subscriber's house from the specific location or any other personal message. The message is then uploaded to the network where it will become available to other network subscribers. The person creating the message can designate whether the message is available to all subscribers, only the persons stored in the memory of the Subscriber's Device, a subset of the persons stored in memory, or even a single person.

In order to enhance the user's experience with the above-type of context-aware messaging system, the types of information provided to the users must go beyond simple text, images, and video. Therefore, a need exists for a method and apparatus for messaging within a context-aware messaging system that enhances the user's experience.

DETAILED DESCRIPTION OF THE DRAWINGS

In order to address the above-mentioned need, a method and apparatus for messaging within a mobile virtual and augmented reality system is provided herein. During operation a user can create "virtual graffiti" that will be left for a particular device to view as part of an augmented reality scene. The virtual graffiti will be assigned to a particular physical location. The virtual graffiti is then uploaded to a network server, along with the location and individuals who are able to view the graffiti as part of an augmented reality scene. When a device that is allowed to view the graffiti is near the location, the graffiti will be downloaded to the device and displayed as part of an augmented reality scene. In order to prevent an overwhelming amount of virtual graffiti being presented to a single user, content filtering takes place on the graffiti so that only wanted graffiti is displayed on a user's device.

In an augmented reality system, computer generated images, or "virtual images" may be embedded in or merged with the user's view of the real-world environment to enhance the user's interactions with, or perception of the environment. In the present invention, the user's augmented reality system merges any virtual graffiti messages with the user's view of the real world.

As an example, a first user may wish to leave a message for a second user to try a particular menu item at a restaurant. The message may be virtually written on the door of the restaurant, and left for the second user to view. When the second user visits the restaurant, he will receive an indication that virtual graffiti is available for him to view. The message will then appear to the second user on the door of the restaurant when viewed with the second user's augmented reality system. In a similar manner, the user may wish to leave a message for himself.

The present invention encompasses a method for providing a device with virtual graffiti. The method comprises the steps of receiving user feedback regarding a type of virtual graffiti a first device wishes to receive or not to receive, receiving information representing virtual graffiti from a second device along with the location of the virtual graffiti, receiving a location of the first device, and providing the first device with the virtual graffiti when the location of the first device is near the location of the virtual graffiti, and the virtual graffiti is the type of graffiti the first device wishes to receive.

The present invention additionally encompasses an apparatus for filtering virtual graffiti. The apparatus comprises a receiver receiving user feedback regarding a type of virtual graffiti a first device wishes to receive or not to receive, and also receiving virtual graffiti from a second device along with the location of the virtual graffiti. The apparatus additionally comprises a personal object manager receiving a location of a first device, and a transmitter providing the first device with the virtual graffiti when the location of the first device is near the location of the virtual graffiti, and the virtual graffiti is the type of graffiti the first device wishes to receive.

The present invention additionally encompasses a method for filtering virtual graffiti. The method comprises the steps of receiving user feedback regarding a type of virtual graffiti a first device wishes to receive or not to receive, wirelessly receiving from a second device, virtual graffiti, a location of the virtual graffiti, and a list of devices with privileges to view the virtual graffiti, and storing the virtual graffiti, the location of the virtual graffiti, and the list of devices with privileges to view the virtual graffiti. Locations from the devices with privileges to view the virtual graffiti are periodically received and a determination is made that the first device is near the location of the virtual graffiti. The first device will be wirelessly provided with the virtual graffiti when the first device is near the location of the virtual graffiti, and the virtual graffiti is the type of graffiti the first device wishes to receive.

The present invention additionally encompasses a method for filtering virtual graffiti. The method comprises the steps of wirelessly receiving virtual graffiti from a server, determining if the virtual graffiti is from a type of graffiti that a user wishes to display, and displaying the virtual graffiti when the virtual graffiti is from the type of graffiti that the user wishes to display.

Figure 1:
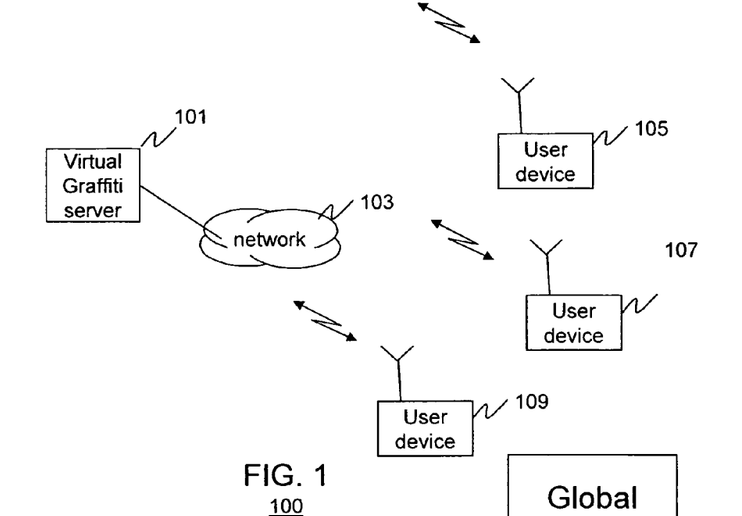
FIG. 1 is a block diagram of a context-aware messaging system.

Turning now to the drawings, wherein like numerals designate like components, FIG. 1 is a block diagram of context-aware messaging system 100. System 100 comprises virtual graffiti server 101, network 103, and user devices 105-109. In one embodiment of the present invention, network 103 comprises a next-generation cellular network, capable of high data rates. Such systems include the enhanced Evolved Universal Terrestrial Radio Access (UTRA) or the Evolved Universal Terrestrial Radio Access Network (UTRAN) (also known as EUTRA and EUTRAN) within 3GPP, along with evolutions of communication systems within other technical specification generating organizations (such as 'Phase 2' within 3GPP2, and evolutions of IEEE 802.11, 802.16, 802.20, and 802.22). User devices 105-109 comprise devices capable of real-world imaging and providing a user with the real-world image augmented with virtual graffiti.

During operation, a user (e.g., a user operating user device 105) determines that they wish to send another user virtual graffiti as part of an augmented reality scene. User device 105 is then utilized to create the virtual graffiti and associate the virtual graffiti with a location. The user also provides device 105 with a list of user(s) (e.g., user 107) that will be allowed to view the virtual graffiti. Device 105 then utilizes network 103 to provide this information to virtual graffiti server 101.

Server 101 periodically monitors the locations of all devices 105-109 along with their identities, and when a particular device is near a location where it is to be provided with virtual graffiti, server 101 utilizes network 103 to provide this information to the device. When a particular device is near a location where virtual graffiti is available for viewing, the device will notify the user, for example, by beeping. The user can then use the device to view the virtual graffiti as part of an augmented reality scene. Particularly, the virtual graffiti will be embedded in or merged with the user's view of the real-world. It should be noted that in alternate embodiments, no notification is sent to the user. It would then be up to the user to find any virtual graffiti in his environment.

Figure 2:
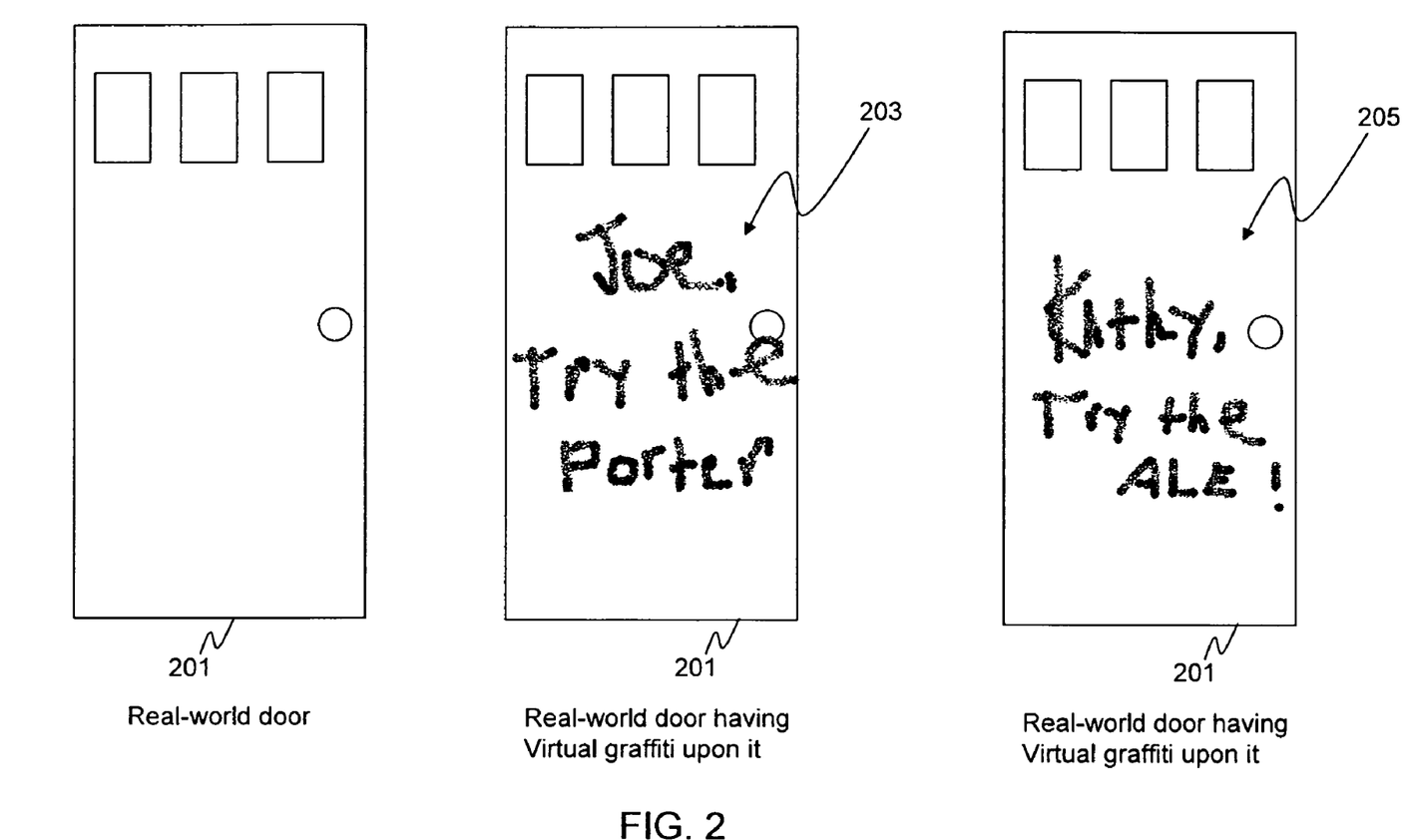
FIG. 2 illustrates an augmented reality scene.

FIG. 2 illustrates an augmented reality scene. In this example, a user has created virtual graffiti 203 that states, "Joe, try the porter" and has attached this graffiti to the location of the door. As is shown in FIG. 2, the real-world door 201 does not have the graffiti existing upon it. However, if a user has privileges to view the virtual graffiti, then their augmented reality viewing system will show door 201 having graffiti 203 upon it. Thus, as is obvious, the virtual graffiti is not available to all users of system 100. The graffiti is only available to those designated able to view it (preferably by the individual who created the graffiti). Thus, each device 105-109 will provide a unique augmented reality scene to their user. For example, a first user may view a first augmented reality scene, while a second user may view a totally different augmented reality scene. This is illustrated in FIG. 2 with graffiti 205 being different than graffiti 203. Thus, a first user, looking at door 201 may view graffiti 203, while a second user, looking at the same door 201 may view graffiti 205.

Although the above example was given with virtual graffiti 203 displayed on a particular object (i.e., door 201), in alternate embodiments of the present invention, virtual graffiti may be displayed not attached to any object. For example, graffiti may be displayed as floating in the air, or simply in front of a person's field of view. As is evident, for any particular device 105-109 to be able to display virtual graffiti attached to a particular object, a node must be capable of identifying the object's location, and then displaying the graffiti at the object's location. There are several methods to accomplish this task. In one embodiment of the present invention, this is accomplished via the technique described in US2007/0024527, METHOD AND DEVICE FOR AUGMENTED REALITY MESSAGE HIDING AND REVEALING by the augmented reality system using vision recognition to attempt to match the originally created virtual graffiti to the user's current environment. For example, the virtual graffiti created by a user may be uploaded to server 101 along with an image of the graffiti's surroundings. The image of the graffiti's surroundings along with the graffiti can be downloaded to a user's augmented reality system, and when a user's surroundings match the image of the graffiti's surroundings, the graffiti will be appropriately displayed.

In another embodiment of the present invention the attachment of the virtual graffiti to a physical object is accomplished by assigning the physical coordinates of the physical object (assumed to be GPS, but could be some other system) to the virtual graffiti. The physical coordinates must be converted into virtual coordinates used by the 3D rendering system that will generate the augmented reality scene (one such 3D rendering system is the Java Mobile 3D Graphics, or M3G, API specifically designed for use on mobile devices.) The most expedient way to accomplish the coordinate conversion is to set the virtual x coordinate to the longitude, the virtual y coordinate to the latitude, and the virtual z coordinate to the altitude thus duplicating the physical world in the virtual world by placing the origin of the virtual coordinate system at the center of the earth so that the point (0,0,0) would correspond the point where the equator and the prime meridian cross, projected onto the center of the earth. This would also conveniently eliminate the need to perform computationally expensive transformations from physical coordinates to virtual coordinates each time a virtual graffiti message is processed.

As previously mentioned, the physical coordinate system is assumed to be GPS, but GPS may not always be available (e.g., inside buildings). In such cases, any other suitable location system can be substituted, such as, for example, a WiFi-based indoor location system. Such a system could provide a location offset $(x_o, y_o, z_o)$ from a fixed reference point $(x_r, y_r, z_r)$ whose GPS coordinates are known. Whatever coordinate system is chosen, the resultant coordinates will always be transformable into any other coordinate system.

After obtaining the virtual coordinates of the virtual graffiti, a viewpoint must be established for the 3D rendering system to be able to render the virtual scene. The viewpoint must also be specified in virtual coordinates and is completely dependent upon the physical position and orientation (i.e., viewing direction) of the device. If the viewpoint faces the virtual graffiti, the user will see the virtual graffiti from the viewpoint's perspective. If the user moves toward the virtual graffiti, the virtual graffiti will appear to increase in size. If the user turns 180 degrees in place to face away from the virtual graffiti, the virtual graffiti will no longer be visible and will not be displayed. All of these visual changes are automatically handled by the 3D rendering system based on the viewpoint.

Given a virtual scene containing virtual graffiti (at the specified virtual coordinates) and a viewpoint, the 3D rendering system can produce a view of the virtual scene unique to the user. This virtual scene must be overlaid onto a view of the real world to produce an augmented reality scene. One method to overlay the virtual scene onto a view of the real world from the mobile device's camera is to make use of the M3G background object which allows any image to be placed behind the virtual scene as its background. Using the M3G background, continuously updated frames from the camera can be placed behind the virtual scene, thus making the scene appear to be overlaid on the camera output.

Given the above information, when a user views virtual graffiti, the device's location is determined and sent to the server. The server determines what messages, if any, are in proximity to and available for the user. These messages are then downloaded by the user and processed. The processing involves transforming the physical locations of the virtual messages into virtual coordinates. The messages are then placed at those virtual coordinates. At the same time, the device's position and its orientation are used to define a viewpoint into the virtual world also in virtual coordinates. If the downloaded virtual message is visible from the given viewpoint, it is rendered on a mobile device's display on top of live video of the scene from, for example, a device's camera (imager).

Thus, if the user wants to place a virtual message on the top of an object, the user must identify the location of the point on top of the object where the message will be left. In the simplest case, the user can place his device on the object and capture the location. He then sends this location with the virtual object and its associated content (e.g., a beer stein with the text message "try the porter" applied to the southward-facing side of the stein) to the server. The user further specifies that the message be available for a particular user. When the particular user arrives at the bar and is within range of the message, he will see the message from his location (and, therefore, his viewpoint). If he is looking toward the eastward-facing side of the message, he will see the stein, but will just be able to tell that there is some text message on the southern side. If a user wishes to read the text message, he will have to move his device (and thus his viewpoint) so that it is facing the southern side of the stein.

Figure 3:
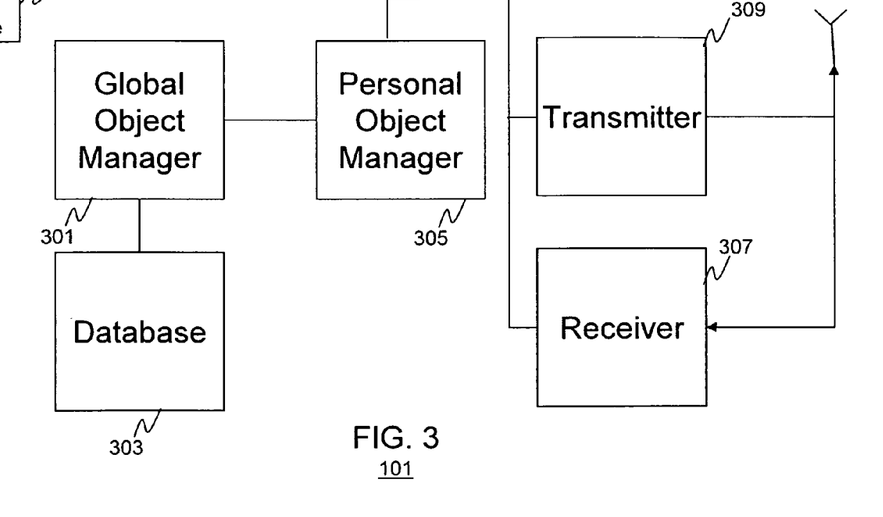
FIG. 3 is a block diagram of the server of FIG. 1.

FIG. 3 is a block diagram of a server of FIG. 1. As is evident, server 101 comprises a global object manager 301, database 303, and personal object manager 305. During operation, global object manager 301 will receive virtual graffiti from any device 105-109 wishing to store graffiti on server 101. This information is preferably received wirelessly through receiver 307. Global object manager 301 is responsible for storing all virtual graffiti existing within system 100. Along with the virtual graffiti, global object manager 301 will also receive a location for the graffiti along with a list of devices that are allowed to display the graffiti. Again, this information is preferably received wirelessly through receiver 307. If the graffiti is to be attached to a particular item, then the information needed for attaching the virtual graffiti to the object will be received as well. For the first embodiment, a digital representation of the item's surroundings will be stored; for the second embodiment, the physical location of the virtual graffiti will be stored. All of the above information is stored in database 303.

Although only one personal object manager 305 is shown in FIG. 3, it is envisioned that each subscriber will have its own personal object manager 305. Personal object manager 305 is intended to serve as an intermediary between its corresponding subscriber and global object manager 301. Personal object manager 305 will periodically receive a location for its corresponding subscriber's device. Once personal object manager 305 has determined the location of the device, personal object manager 305 will access global object manager 301 to determine if any virtual graffiti exists for the particular device at, or near the device's location. Personal object manager 305 filters all available virtual graffiti in order to determine only the virtual graffiti relevant to the particular device and the device's location. Personal object manager 305 then provides the device with the relevant information needed to display the virtual graffiti based on the location of the device, wherein the relevant virtual graffiti changes based on the identity and location of the device. This information will be provided to the device by instructing transmitter 309 to transmit the information wirelessly to the device.

Figure 4:
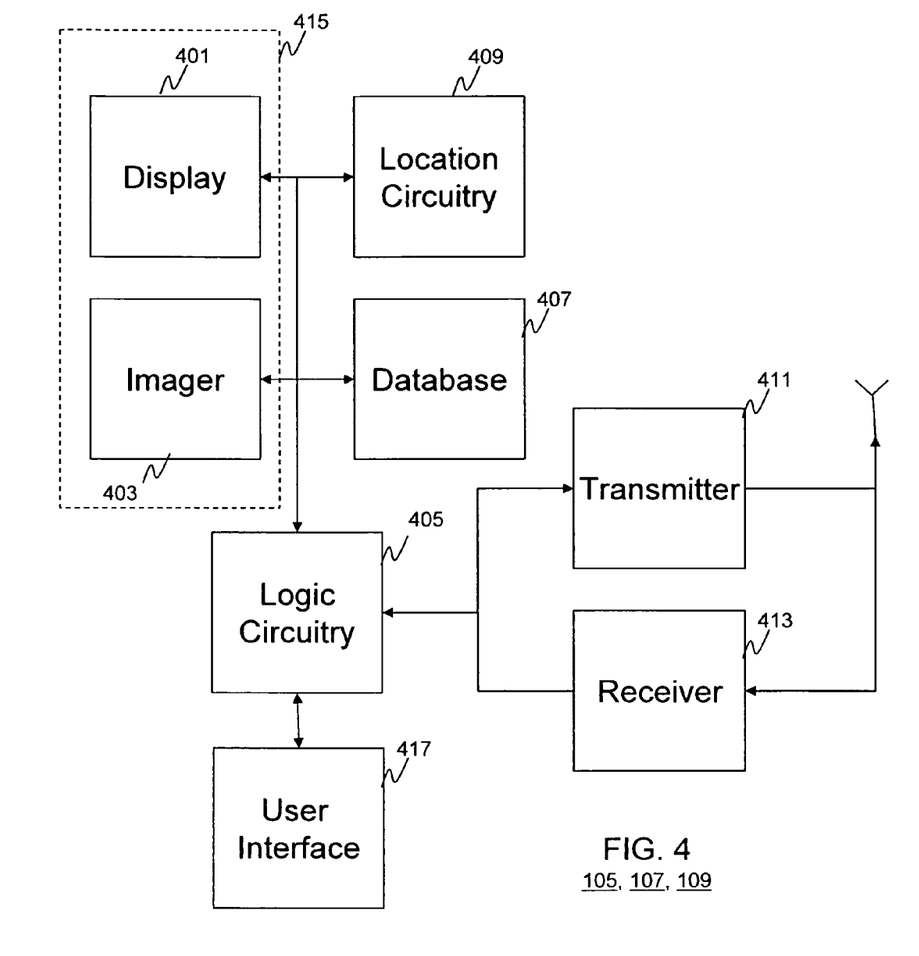
FIG. 4 is a block diagram of the user device of FIG. 1.

FIG. 4 is a block diagram of a user device of FIG. 1. As shown, the user device comprises augmented reality system 415, location circuitry 409, database 407, logic circuitry 405, transmitter 411, receiver 413, and user interface 417. During operation, a user of the device creates virtual graffiti via user interface 417. In one embodiment of the present invention, user interface 417 comprises an electronic tablet capable of receiving and creating handwritten messages and/or pictures. Once logic circuitry 405 receives the virtual graffiti from user interface 417, logic circuitry 405 accesses location circuitry 409 and determines a location where the graffiti was created. Logic circuitry 405 also receives a list of users with privileges to view the graffiti. This list is also provided to logic circuitry 405 through user interface 417.

In one embodiment of the present invention the virtual graffiti is also associated with a physical object. When this is the case, logic circuitry 405 will also receive information required to attach the graffiti to an object. Finally, the virtual graffiti is provided to virtual graffiti server 101 by logic circuitry 405 instructing transmitter 411 to transmit the virtual graffiti, the location, the list of users able to view the graffiti, and if relevant, the information needed to attach the graffiti to an object.

As discussed above, server 101 periodically monitors the locations of all devices 105-109 along with their identities, and when a particular device is near a location where it is to be provided with virtual graffiti, server 101 utilizes network 103 to provide this information to the device.

When a particular device is near a location where virtual graffiti is available for viewing, the device will notify the user, for example, by instructing user interface 417 to beep. The user can then use the device to view the virtual graffiti as part of an augmented reality scene. Thus, when the device of FIG. 4 is near a location where virtual graffiti is available for it, receiver 413 will receive the graffiti and the location of the graffiti from server 101. If relevant, receiver 413 will also receive information needed to attach the graffiti to a physical object. This information will be passed to logic circuitry 405 and stored in database 407.

Logic circuitry 405 periodically accesses location circuitry 409 to get updates to its location (e.g., a geographic region) and provides these updates to server 101. When logic circuitry 405 determines that the virtual graffiti should be displayed, it will notify the user of the fact. The user can then use augmented reality system 415 to display the graffiti. More particularly, imager 403 will image the current background and provide this to display 401. Display 401 will also receive the virtual graffiti from database 407 and provide an image of the current background with the graffiti appropriately displayed. Thus, the virtual graffiti will be embedded in or merged with the user's view of the real-world.

As discussed above, augmented reality system 415 may use vision recognition to attempt to match the originally created virtual graffiti to the user's current environment. When display 401 determines that the user's surroundings match the image of the graffiti's surroundings, the graffiti will be appropriately displayed, for example, attached to a physical object.

Figures 5, 6:
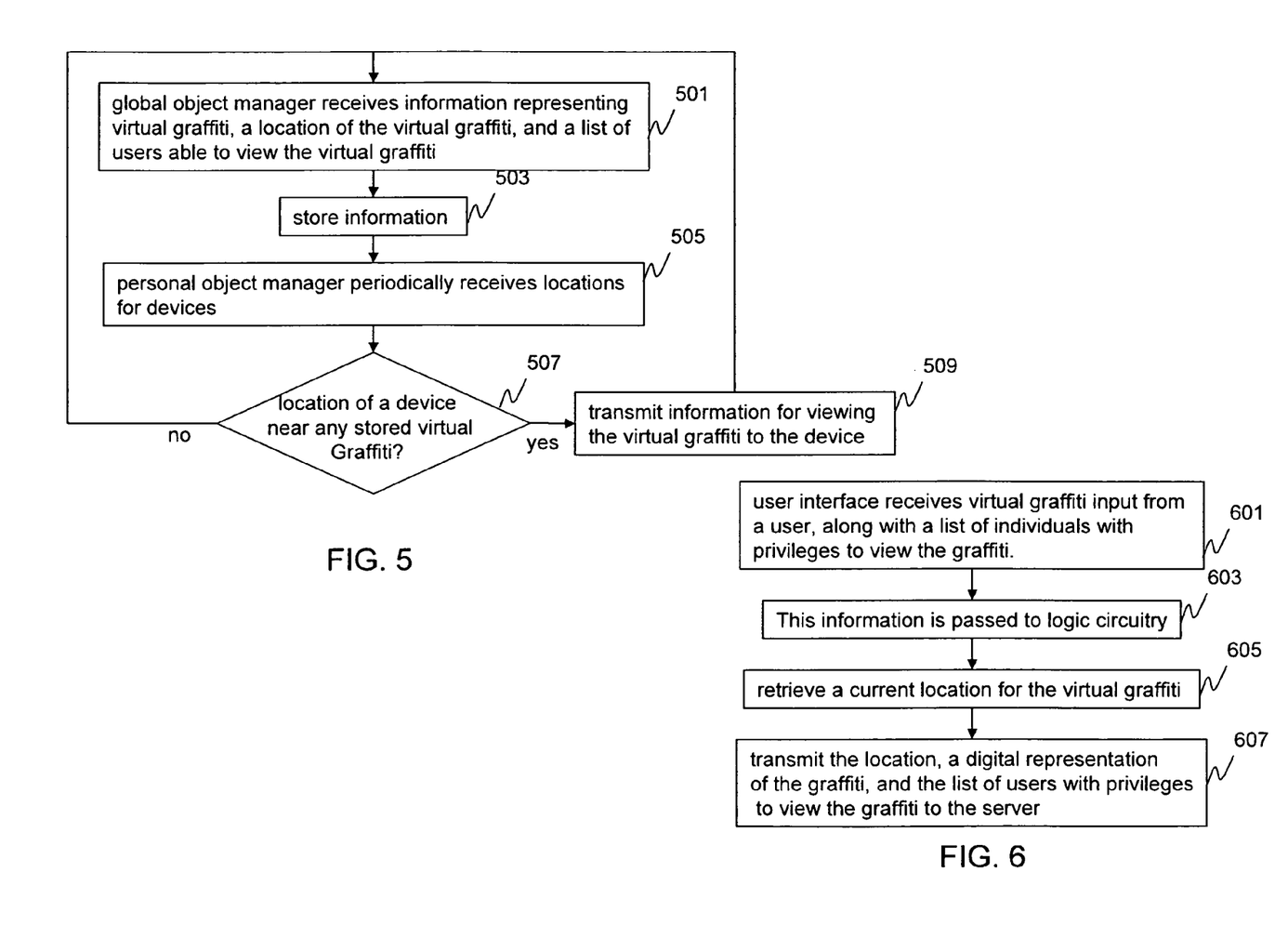
FIG. 5 is a flow chart showing operation of the server of FIG. 1.
FIG. 6 is a flow chart showing operation of the user device of FIG. 1.

FIG. 5 is a flow chart showing operation of the server of FIG. 1. The logic flow begins at step 501 where global object manager 301 receives from a first device, information representing virtual graffiti, a location of the virtual graffiti, and a list of users able to view the virtual graffiti. This information is then stored in database 303 (step 503). As discussed above, personal object managers 305 will periodically receive locations for devices (step 505) and determine if the location of a device is near any stored virtual graffiti (step 507). If, at step 507, personal object manager 305 determines that its corresponding device is near any virtual graffiti that it is able to view, then the logic flow continues to step 509 where the graffiti and the necessary information for viewing the virtual graffiti are wirelessly transmitted to the device. However, if at step 507, it is determined that the device is not near any virtual graffiti, then the logic flow returns to step 501. As discussed above, the virtual graffiti is restricted as to what device can display the virtual graffiti.

FIG. 6 is a flow chart showing operation of the user device of FIG. 1. In particular, the logic flow of FIG. 6 shows the steps necessary to create virtual graffiti and store the graffiti on server 101 for others to view. The logic flow begins at step 601 where user interface 417 receives virtual graffiti input from a user, along with a list of users with privileges to view the graffiti. This information is passed to logic circuitry 405 (step 603). At step 605, logic circuitry 405 accesses location circuitry 409 and retrieves a current location for the virtual graffiti. The logic flow continues to step 607 where logic circuitry 405 instructs transmitter 411 to transmit the location, a digital representation (e.g., a jpeg or .gif image) of the graffiti, and the list of users with privileges to view the graffiti to server 101. It should be noted that in the 3D virtual object case, the digital representation could include URLs to 3D models and content (e.g., photos, music files, etc.)

Figure 7:
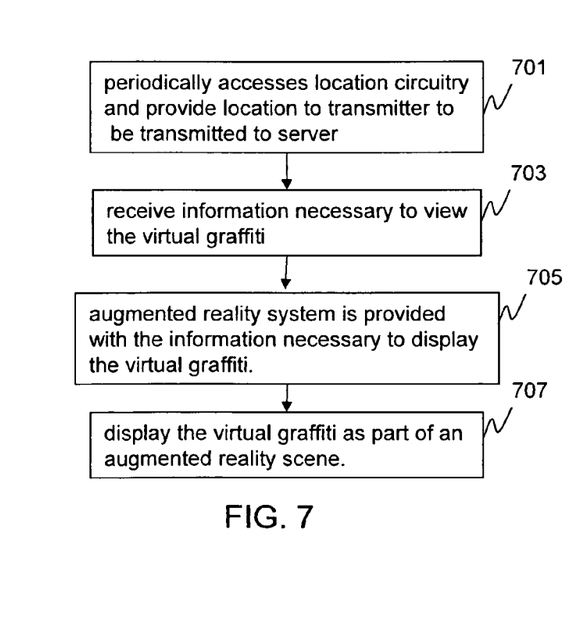
FIG. 7 is a flow chart showing operation of the user device of FIG. 1.

FIG. 7 is a flow chart showing operation of the user device of FIG. 1. In particular, the logic flow of FIG. 7 shows those steps necessary to display virtual graffiti. The logic flow begins at step 701 where logic circuitry 405 periodically accesses location circuitry 409 and provides a location to transmitter 411 to be transmitted to server 101. At step 703, receiver 413 receives information necessary to view the virtual graffiti. As discussed above, this information may simply contain a gross location of the virtual graffiti's location along with a representation of the virtual graffiti. In other embodiments, this information may contain the necessary information to attach the virtual graffiti to an object. Such information may include a digital representation of the physical object, or a precise location of the virtual graffiti. At step 705, logic circuitry 405 accesses augmented reality system 415 and provides system 415 with the information necessary to display the virtual graffiti. For the 3D case, this would include the device's orientation to specify a viewpoint. Finally, at step 707, display 401 displays the virtual graffiti as part of an augmented reality scene.

It is envisioned that in some situations an overwhelming amount of virtual graffiti may be presented to a single user. In order to address this issue, content filtering may take place on the graffiti so that only specific graffiti is displayed on a user's device. For example, consider FIG. 8. Real-world door 801 is shown having multiple virtual graffiti images 803 existing upon it. As is evident, the existence of so many images upon door 801 makes any one message hard to read. Because of this, filtering of the available images takes place so that only wanted image 805 is displayed.

Many techniques for filtering unwanted virtual graffiti are envisioned. One such technique is for server 101 to perform filtering based on some sort of user feedback. Only "wanted" graffiti will then be sent to any particular user. The user feedback may comprise, for example, a questionnaire presented to the user of a particular device that queries the types of graffiti a user wishes to receive (e.g., graffiti from specific users, advertisements, graffiti from unknown users, . . . , etc.).

User feedback may additionally comprise a plurality of ratings indicating a quality, significance, or user's satisfaction of previously sent virtual graffiti. For example, users who view virtual graffiti may be allowed to rate the content of the graffiti. Ratings may for example, be given by integers indicating the quality, significance, or user's satisfaction on the content. Higher integer values are given to high quality contents. These ratings are sent to server 101 and maintained in a user's personal object manager. All graffiti whose overall ratings are below a pre-specified threshold will be blocked.

Figure 8:
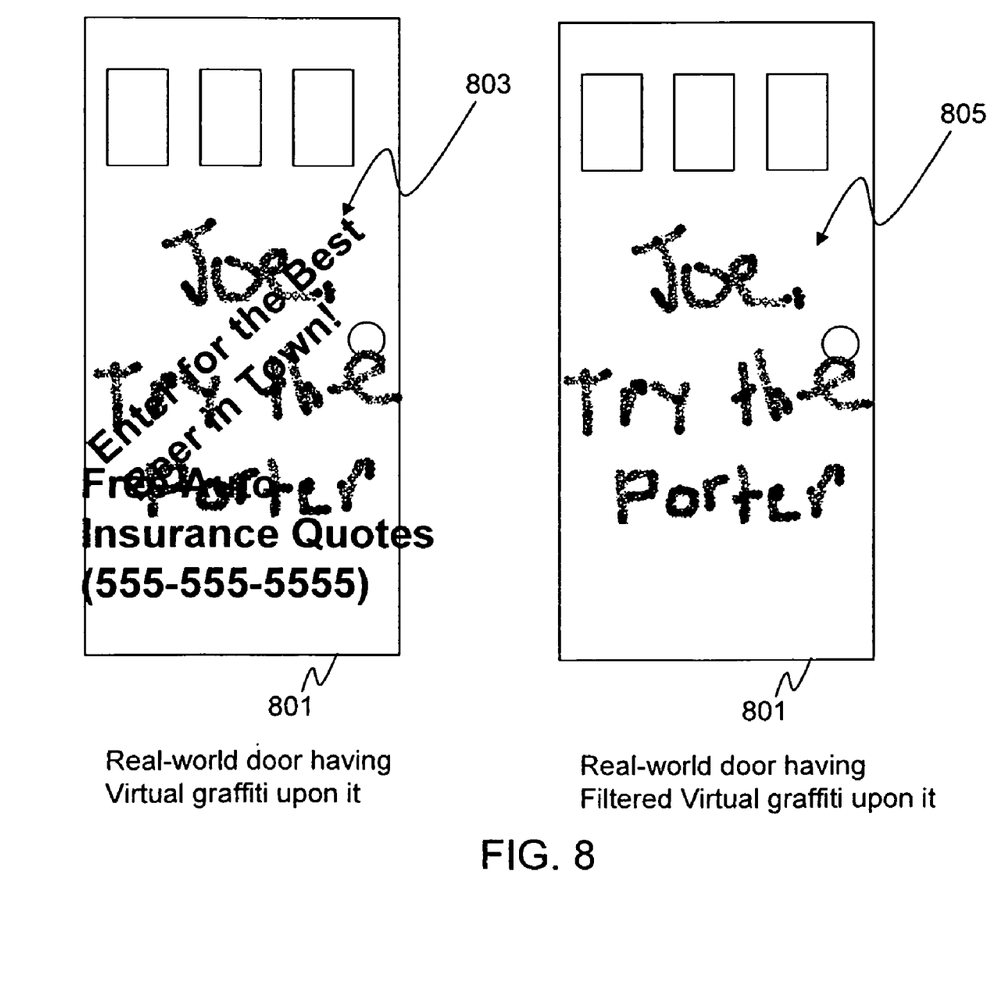
FIG. 8 illustrates multiple virtual graffiti messages.

The benefit associated with filtering at the server is that over-the-air bandwidth is not wasted sending a device graffiti that a user does not wish to view. Additional benefits include the fact that unwanted graffiti will not be stored on a user's device. While there exist benefits to filtering on the server, there are also reasons why one would wish to filter at the device. For example, a user may wish to view all types of graffiti, and choose to filter the graffiti only when filtering is necessary to read any particular message (as shown in FIG. 8).

As with filtering on server 100, there are multiple techniques for filtering at a particular device. For example, display 401 may offer a user a list of currently displayed graffiti, along with the option to turn any graffiti "on" or "off". Another technique may simply be to present a questionnaire to the user that queries the types of graffiti a user wishes to receive (e.g., graffiti from specific users, advertisements, graffiti from unknown users, . . . , etc.). This information will be stored in database 407 so that the device can determine the graffiti that is unwanted.

With any of the above techniques for filtering, it is necessary to have any graffiti "tagged" with a "type" of graffiti. For example, graffiti may be tagged as "advertisements", "personal", "reference", . . . , etc. The graffiti may be tagged upon its creation by the creator of the graffiti, or in the alternative, may be tagged by server 100 upon its reception. Regardless of how the graffiti is tagged, all graffiti should be tagged in order for advanced filtering to take place.

Figure 9:
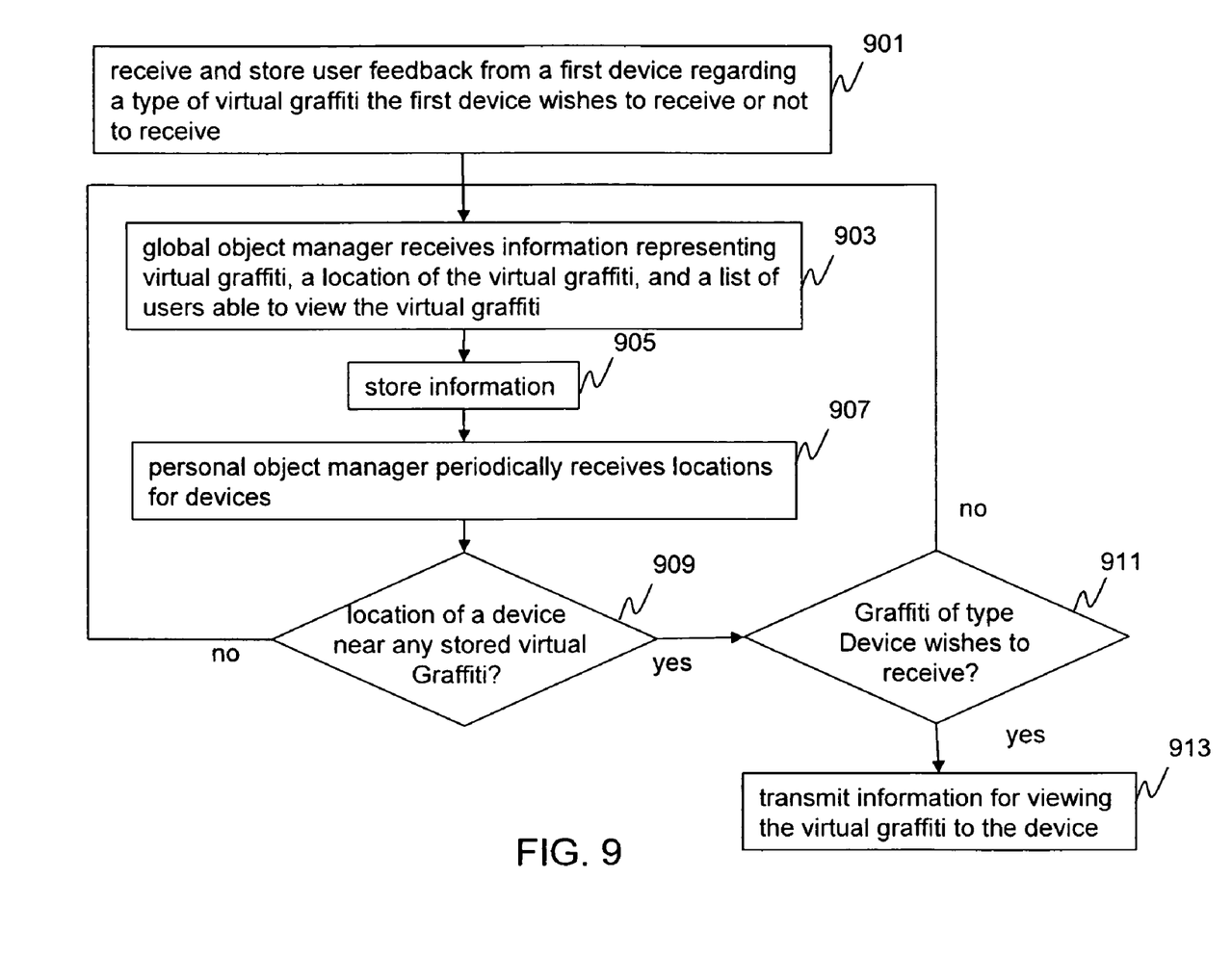
FIG. 9 is a flow chart showing operation of the server of FIG. 1 when performing filtering.

FIG. 9 is a flow chart showing operation of server 100 when performing filtering upon virtual graffiti. The logic flow begins at step 901 where receiver 307 receives user feedback from a first device regarding a type of virtual graffiti the first device wishes to receive or not to receive. This feedback is passed to personal objects manager 305 and ultimately stored in database 303. As discussed above, the user feedback may comprise a plurality of ratings indicating a quality, significance, or user's satisfaction of previously sent virtual graffiti, an answered questionnaire from a user as to what type of virtual graffiti they wish to receive or not to receive, or any other form of feedback indicating a user's preferences on graffiti they wish to view or not view.

At step 903 global object manager 301 receives from a second device, information representing virtual graffiti, a location of the virtual graffiti, and a list of users able to view the virtual graffiti. This information is also stored in database 303 (step 905). As discussed above, personal object managers 305 will periodically receive locations of the first device (step 907) and determine if the location of the first device is near any stored virtual graffiti (step 909). If, at step 909, personal object manager 305 determines that the first device is near any virtual graffiti that it is able to view, then the logic flow continues to step 911 where the type of graffiti is determined as well as if the graffiti is a type of graffiti that the first device wishes to receive. If so, the graffiti and the necessary information for viewing the virtual graffiti are wirelessly transmitted to the first device (step 913).

Figure 10:
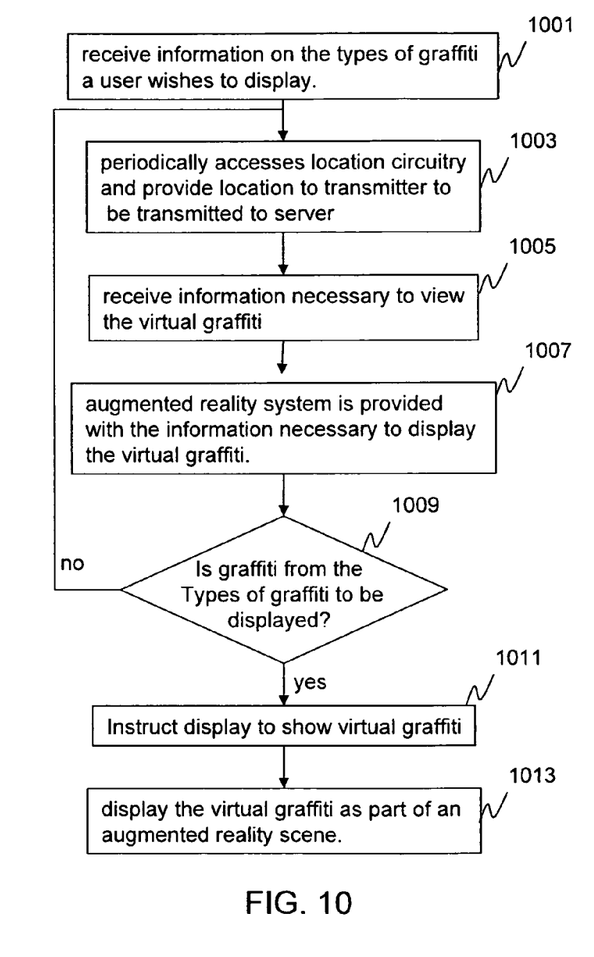
FIG. 10 is a flow chart showing operation of a user device of FIG. 1 when performing filtering.

FIG. 10 is a flow chart showing operation of a user device when performing filtering upon virtual graffiti. In the logic flow of FIG. 10 a user device will receive all virtual graffiti sent to it by server 100. The user device will then filter what is displayed. The logic flow begins at step 1001 where logic circuitry receives information on the types of graffiti a user wishes to display. At step 1003 logic circuitry 405 periodically accesses location circuitry 409 and provides a location to transmitter 411 to be transmitted to server 101. At step 1005, receiver 413 receives information necessary to view the virtual graffiti. At step 1007, logic circuitry 405 accesses augmented reality system 415 and provides system 415 with the information necessary to display the virtual graffiti. This information may be stored in database 407 for later display.

As discussed above, it is envisioned that in some situations an overwhelming amount of virtual graffiti may be presented to a single user. In order to address this issue, content filtering may take place on the graffiti so that only specific graffiti is displayed on a user's device. With this in mind, at step 1009 logic circuitry 405 determines if the virtual graffiti is from the types of graffiti a user wishes to display, and if so, instructs display 401 to display the virtual graffiti (step 1011). Finally, at step 1013, display 401 displays the virtual graffiti as part of an augmented reality scene.

While the invention has been particularly shown and described with reference to particular embodiments, it will be understood by those skilled in the art that various changes in form and details may be made therein without departing from the spirit and scope of the invention. For example, it is envisioned that a user who receives virtual graffiti may be able to modify the graffiti and then store the modified graffiti on server 101. Multiple users may store multiple versions of the modified graffiti on server 101. Users are allowed to modify any version of the graffiti, no matter whether it is the original version, any intermediate versions, or the latest version. Therefore, a hierarchical relationship among all versions of the graffiti can be established, which can be represented as a tree, with each node representing one version of the graffiti and all its children representing the versions that are directly extended from the current version. Each version of the graffiti is given a unique version number, may contain different attributes (such as locations), and may be available to different lists of users. Users can view multiple versions of the graffiti at the same time and have the freedom to choose any versions for further modification. Once the modification is performed by the user, a new version of the graffiti is created and sent to the server along with its location and a list of users having the privilege to view the graffiti. The new version is then stored on the server and is available to other users of the system.

With the above in mind, a first user can create virtual graffiti to be stored on server 101. Server 101 may, at a later time receive the virtual graffiti from a second device along with a location of the modified virtual graffiti, wherein the modified virtual graffiti is an updated version of the virtual graffiti. Similarly, a first user may receive virtual graffiti as described above and then modify the virtual graffiti, sending the modified virtual graffiti back to server 101.

The invention claimed is:

1. A method for providing a device with virtual graffiti, the method comprising the steps of:
   receiving user feedback regarding a type of virtual graffiti a first device wishes to receive or not to receive;
   receiving information representing virtual graffiti from a second device along with the location of the virtual graffiti;
   receiving a location of the first device;
   providing the first device with the virtual graffiti when the location of the first device is near the location of the virtual graffiti, and the virtual graffiti is the type of graffiti the first device wishes to receive;
   wherein the step of receiving user feedback comprises the step of receiving a plurality of ratings indicating a quality, significance, or user's satisfaction of previously sent virtual graffiti.

2. The method of claim 1 wherein the step of receiving user feedback comprises the step of receiving an answered questionnaire from a user as to what type of virtual graffiti they wish to receive or not to receive.

3. The method of claim 1 further comprising the step of: identifying the virtual graffiti as a type of virtual graffiti.

4. The method of claim 1 wherein the virtual graffiti is restricted as to what device can display the virtual graffiti.

5. The method of claim 1 wherein the location of the first device comprises a geographical region where the first device is located.

6. The method of claim 1 wherein the step of providing the first device with the virtual graffiti comprises the step of wirelessly transmitting the virtual graffiti to the first device.

7. The method of claim 1 further comprising the step of: providing the first device with a location of the virtual graffiti.

8. The method of claim 1 wherein the step of receiving the location of the first device comprises the step of wirelessly receiving the location from the first device.

9. The method of claim 1 further comprising the step of: receiving the virtual graffiti from the first device along with a location of the modified virtual graffiti, wherein the modified virtual graffiti is an updated version of the virtual graffiti.

10. An apparatus for filtering virtual graffiti, the apparatus comprising:
    a receiver receiving user feedback regarding a type of virtual graffiti a first device wishes to receive or not to receive, and also receiving virtual graffiti from a second device along with the location of the virtual graffiti;
    a personal object manager receiving a location of a first device;
    a transmitter providing the first device with the virtual graffiti when the location of the first device is near the location of the virtual graffiti, and the virtual graffiti is the type of graffiti the first device wishes to receive;
    wherein the user feedback comprises a plurality of ratings indicating a quality, significance, or user's satisfaction of previously sent virtual graffiti.

11. The apparatus of claim 10 wherein the user feedback comprises an answered questionnaire from a user as to what type of virtual graffiti they wish to receive or not to receive.

12. The apparatus of claim 10 wherein the personal object manager additionally identifies the virtual graffiti as a type of virtual graffiti.

13. The apparatus of claim 10 wherein the virtual graffiti is restricted as to what device can display the virtual graffiti.

14. The apparatus of claim 10 wherein the location of the device comprises a geographical region where the device is located.

15. The apparatus of claim 10 wherein the transmitter wirelessly provides the first device with the virtual graffiti.

16. The apparatus of claim 10 wherein the transmitter further provides the first device with a location of the virtual graffiti.

* * * * *